United States Patent [19]

McIntosh

[11] 3,971,899

[45] July 27, 1976

[54] SIGNALLING DEVICE FOR KEY TELEPHONE SYSTEMS

[76] Inventor: Alexander C. McIntosh, P.O. Box 1673, Bellevue, Wash. 98009

[22] Filed: July 17, 1975

[21] Appl. No.: 596,960

Related U.S. Application Data

[63] Continuation-in-part of Ser. No. 569,396, April 18, 1975, Pat. No. 3,941,944.

[52] U.S. Cl............................. 179/99; 179/84 VF
[51] Int. Cl.²......................................... H04M 1/50
[58] Field of Search............ 179/99, 84 VF, 18 AD, 179/37–40; 340/171 R; 328/116, 117, 150; 325/396

[56] References Cited
UNITED STATES PATENTS

| | | | |
|---|---|---|---|
| 3,582,562 | 6/1971 | Sellari............................ | 179/18 AD |
| 3,622,710 | 11/1971 | Tothill........................... | 179/84 VF |
| 3,701,854 | 10/1972 | Anderson et al................ | 179/18 AD |
| 3,780,230 | 12/1973 | Bowen et al..................... | 179/84 VF |
| 3,795,775 | 3/1974 | Cowpland....................... | 179/84 VF |
| 3,806,664 | 4/1974 | Bowen et al..................... | 179/84 VF |
| 3,845,249 | 10/1974 | Sellari et al..................... | 179/84 VF |

Primary Examiner—Kathleen H. Claffy
Assistant Examiner—Gerald L. Brigance
Attorney, Agent, or Firm—Sherman Levy

[57] ABSTRACT

A device used in conjunction with key telephone systems, for example, intercom systems. The device consists of a circuit for decoding the tone output from touch-tone telephones, indicating which digit has been operated and selectively signalling the called party. Special features include a minimum latcing time for received signals and a time-out circuit. A noise, or "talk-down" protection circuit is included; if a signal of any type is present in the slot between the low group and the high group touch tone signals, the input to the decoders is shunted out and the time-out circuit is disabled. Also included is a second phase lock loop connected to the lowest frequency decoder in order to decrease the recognition time. A relay decoding matrix is also provided, arranged to accommodate either single or two-digit codes. The device may be used in key telephone systems which include rotary dial equipment as well as touch tone equipment.

11 Claims, 3 Drawing Figures

SIGNALLING DEVICE FOR KEY TELEPHONE SYSTEMS

This is a continuation-in-part of application S.N. 569,396, filed Apr. 18, 1975, now U.S. Pat. No. 3,941,944, entitled "Signalling Device for Key Telephone Systems."

BRIEF SUMMARY OF THE INVENTION

This invention is directed to an improved signal detection and calling device for use with key telephone systems, as for example, intercom systems.

The embodiments shown may utilize either single or two-digit codes, providing or a system of up to 19 stations. It also provides for conference calling on both single and two digit systems and allows conference calls to be established while the system is in use.

The invention embodies a unique latching feature which assures that normally the calling signal remains on for at least one second. It also provides a time-out circuit whereby signal detection is inhibited while the detection circuit is latched in.

BACKGROUND OF THE INVENTION

In recent years the art in the field of telephone systems has been advanced through the use of tone switching systems in which the line switching and signalling information are transmitted through the telephone lines in the form of audio tones. In general, two pure tones are used in most switching systems to improve reliability and to prevent voice generated audio signals from confusing the tone detectors. In a key system, these tones originate from the depression of keys on a telephone keyboard.

An object of the present invention is to provide an improved signalling device for key telephone systems using tone detection which combines all circuit and logical functions in a single device. Another object of this invention is to provide an intercom signalling device which allows the connection of up to 19 intercom stations. Still another object of the invention is to provide an intercom signalling device which may utilize either single digit or two digit codes. A further object of the invention is to provide conference calling on both single digit and two digit systems utilizing the same device. Yet another object of the invention is to provide a device which permits conference calls to be established while the system is in use. Still another object of the invention is to provide a device in which the calling signals can be repeated without the necessity of operating the switch hook on the telephone instrument. Yet another object of the invention is to provide a device which includes a one second signal contact closure whenever an intercom signal is detected. Still another object of the invention is to provide a lock-out of incoming signals immediately following the detection of a calling tone. Yet another object of the invention is to provide a device which may be used with rotary dial equipment on the same line as the touch-tone system. Still another object of the invention is to provide a device which is so compact and self-contained that it may be installed in a fraction of the time and at less cost than prior art systems.

A further object of the invention is to provide noise, or "talk-down," protection in a system as above described using low group and high group touch tone signals, so that if a signal of any type is present in the slot between the low group and high group touch tone signals, the input to the signal decoders is shunted out and the time-out circuit of the system is disabled.

A still further object of the invention is to provide substantial reduction in the recognition time of at least the lowest frequency decoder of the system.

BRIEF DESCRIPTION OF THE SEVERAL VIEWS OF THE DRAWINGS

The above and other objects and advantages of the invention will become apparent upon full consideration of the following detailed description accompanying the drawings, in which.

DETAILED DESCRIPTION

Figure 1:
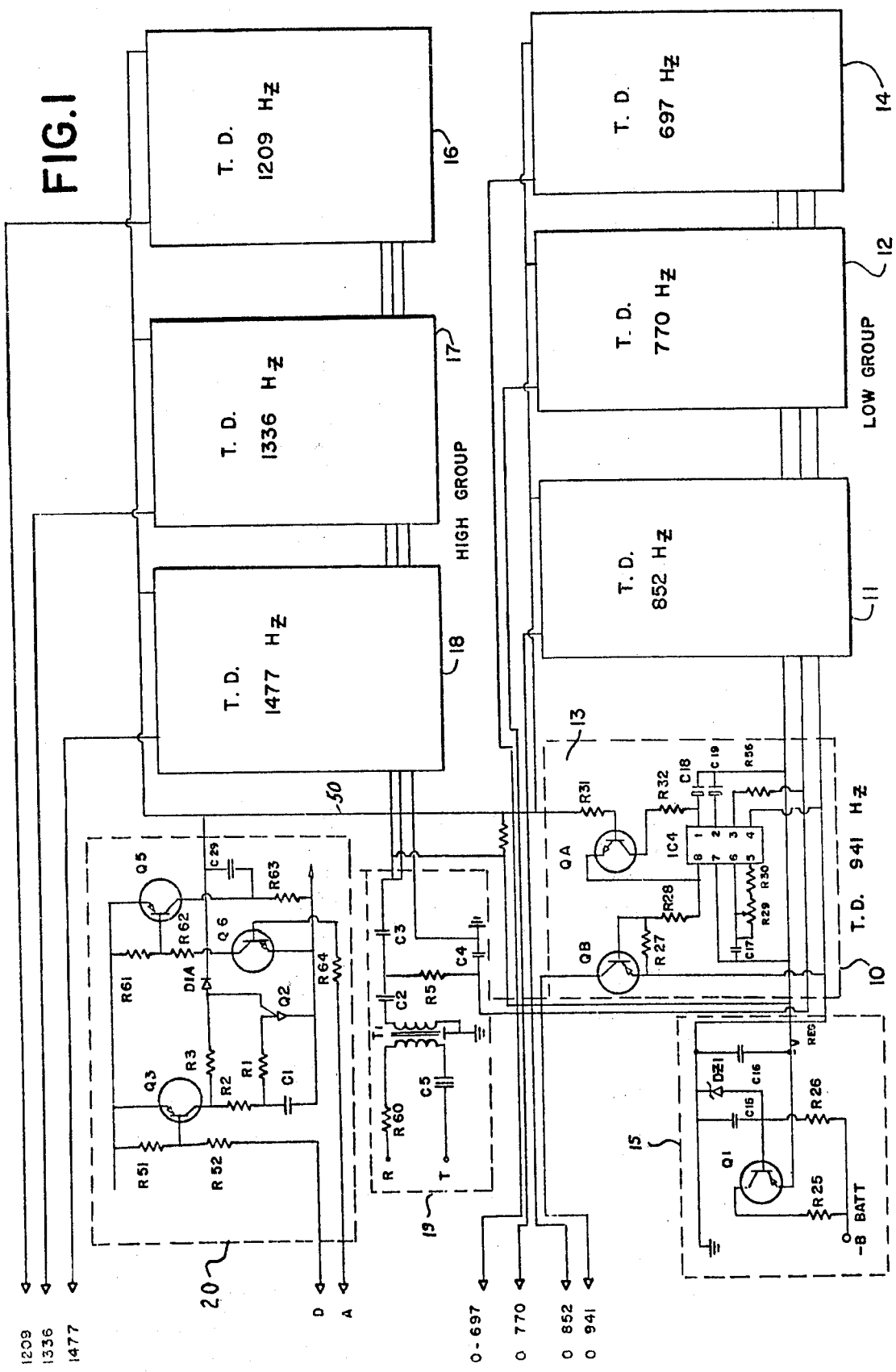
FIG. 1 is a schematic diagram of a tone decoder including regulated power supply latching and time-out circuits, according to the present invention.

Referring now to the drawings, at 19 in FIG. 1 is shown a connection to the telephone line in which the connection labeled R stands for the RING line and the connection T stands for the TIP line. These terms are standard in telephone systems. The circuit shown at 19 is required to convert the balanced circuit commonly used on telephone lines to an unbalanced arrangement required for tone detection. A transformer T1 serves this purpose in addition to matching the relatively high impedance of the tone decoder circuits to the 600 ohm line impedance. Capacitor C5 serves to protect the transformer from the DC voltage provided by the line feed coil. This is explained in more detail later in the description. A small resistor R60 serves to limit the peak currents into the transformer which result from line transients, etc.

Information which passes through T1 from the line consists of talking information as well as audio signalling tones. The signalling system utilized here is commonly known in the telephone art, consisting of groups of audio tones taken two at a time. Sinusoidal tones of specified frequencies are used to define each of the buttons on the telephone keyboard. The specified tones utilized are divided into a high frequency group and a low frequency group tones. The low frequency group consists of four frequencies standardized by wide spread usage in the telephone industry. These are 697 Hz, 770 Hz, 852 Hz, and 941 Hz. The high group consists of 1209 Hz, 1336 Hz, and 1477 Hz. These frequencies are produced when the buttons are depressed on the standard ten button keyboard or pad which is in common usage throughout the United States telephone industry for so-called touch-tone dialing.

The output of transformer T1 is fed in the present embodiment into a series of tone decoders. FIG. 1 shows in block diagram form how the seven tone decoders associated with each of these seven touch-tone frequencies are connected with a common input so that signals appearing on the secondary of T1 are presented simultaneously to all seven tone decoder circuits.

Also in this embodiment of the invention, FIG. 1 shows a typical tone decoder circuit consisting of a phase locked loop tone decoder. The phase lock circuit is shown as a single component consisting of an integrated circuit available from several manufacturers. The integrated circuit is used in conjunction with several external components to select the frequency to which the circuit will be responsive. Two external transistors are also used in each tone decoder to produce drive power and to accomplish the latch and time-out functions. All seven tone decoder circuits are identical in this embodiment with the exception of those components which select the frequency to which the circuit will respond. The typical circuit is shown in FIG. 1 at 13, and the tone decoders are respectively shown at 10, 11, 12, 14, 16, 17, and 18.

Signals appearing at the output, or secondary, side of T1 undergo a coarse separation into high and low frequency groups by means of RC filter circuits which are interposed between the transformer output and the decoder circuit busses. C2 blocks the DC ground path to the phase lock loops. R5 and C4 attenuate the high group signal while passing the low group signal through the low group buss. C3 passes the high group signals to the high group buss while attenuating the low group signals. In addition to separating the high and low groups, the filter circuits are designed to present correct signal levels to the input of the phase lock loop detectors.

The action of the tone decoder circuit can be understood best by analyzing the function of each component shown in the circuit at 13 in FIG. 1. The input to the phase locked loop integrated circuit is supplied through R56 which allows adjustment of the input signal levels from the tone decoder buss. C18 and C19 are used to establish the low frequency lock signal and also to establish the band width required for detection. Capacitor C17 in conjunction with R29 and R30 determines the frequency selection of the individual tone decoder phase locked loop. The loop output is available at pin 8 of the integrated circuit type shown in the present embodiment and is routed via R28 to the base of QB. QB serves as an amplifier which permits operation of the circuit at a higher voltage than the phase locked loop integrated circuit can safely be subjected to. QB also provides a DC reference, establishing the DC positive at ground potential in order to be compatible with most telephone system supplies.

The time out and delatching circuit is shown at 20 in FIG. 1. Q3 in this circuit establishes a positive latching ground to all tone decoder loops via R3 and D1A, the common latch buss and QA transistors.

QA in each tone detector circuit is connected between pins 1 and 8 of the integrated circuit via the current limiting resistor R32. QA serves as the means by which a particular tone decoder circuit may be latched in the "ON" condition. Referring again to FIG. 2, Q4 will be switched "ON" whenever any high loop tone decoding circuit is operating in association with any low group circuit. This provides a negative voltage at terminal D. In FIG. 1 at 20, terminal D is shown feeding the base of transistor Q3. The negative signal at terminal D initiates the latching sequence and those detector circuits which have detected the high and low group tones will be locked in the "ON" condition while all other of the tone decoders will not respond.

Q3 also initiates a time out function in conjunction with the programmable unijunction transistor Q2. When Q3 is switched "ON," a positive potential is applied to the junction of R2 and R3. This starts a charging action on C1 and applies voltage to transistor Q2. Q2 is not conducting at this point and as a result D1A becomes forward biased. This causes the latching buss to have a potential somewhat more positive than the negative power supply voltage. C1 continues charging and in approximately 500 msec reaches a critical voltage at which point Q2 conducts, connecting the anode of diode D1A to the negative supply voltage. This back-biases D1A and removes the positive voltage from the latching buss. This action serves to unlock the two tone decoding circuits which are detecting and opens the path through the matrix, turning off Q4 shown in FIG. 2. This action in turn removes the negative signal from terminal D, turning off Q3 in the time-out and delatching circuit at 20 and restores Q2 to a normal non-conducting state.

Figure 2:
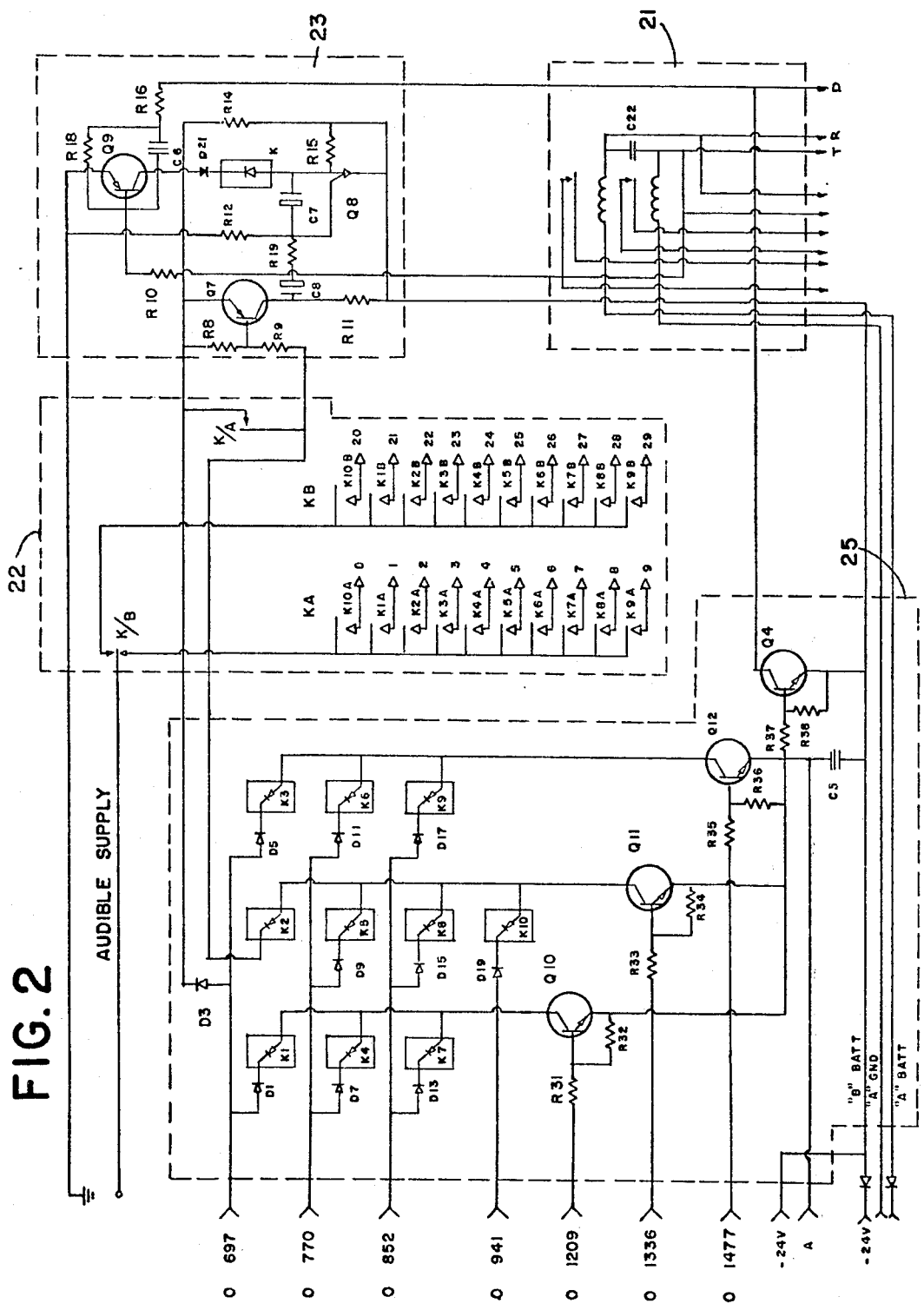
FIG. 2 is a schematic diagram of a relay matrix including provision for either one or two digit signalling and including a line-feed relay according to the present invention.

The outputs of each tone decoder circuit are amplified by transistor QB. The output lines are shown in both FIG. 1 and 2. A diode/transistor matrix is shown at 25 in FIG. 2. This circuit serves to select one of ten decimal output relay coils. Each relay coil is selected as a result of the detection of a high and a low group frequency simultaneously and corresponds to one of the depressed buttons on the calling telephone keyboard. The arrangement of the matrix is such that the output of each of the high group tone decoders is amplified by transistors Q10, Q11, and Q12 respectively, one of which is activated, depending upon which of the three high group tones has been detected. The collector circuits of transistors Q10, Q11 and Q12 are used to pull in a matrix of relay coils depending upon which one of the four low group frequencies has been detected. The arrangement of relay coils K1 through K10 in block 25 of FIG. 2 illustrates the arrangement of push buttons on a common ten button touch-tone telephone instrument keyboard. By means of the matrix shown, one out of ten operated digits may be arrived at as a result of the detection of any two of the seven possible frequencies.

Referring to FIG. 2, transistors Q10, Q11, and Q12 switch the decoder high-group output grounds to the minus DC battery level. Transistors Q10, Q11, and Q12 also invert the outputs of the high-group decoders. The low-group signals are fed into the matrix through diodes and therefore do not undergo inversion. Because of this the diode and relay matrix arrangement can then be suspended between battery and ground voltages with both sides switched. Transistor Q4 is inserted at a common point in order to detect whenever any one of the relays is operated.

Each relay has two form A contact sets. One form A set in each relay is connected to a single digit buss. The other is connected to a two digit buss. Both contact sets close when the relay is operated but only the contact connected to an active buss as directed by the transfer relay will produce an output signal. This arrangement provides for 20 output signals using ten relays plus the transfer relay. Since one digit is lost in operating the transfer relay, a total of 19 relay contacts are available for switching purposes. Suppression diodes are shown bridged across each relay coil to protect the driver transistors from the inductive voltage peaks generated whenever current in the relay coils is interrupted.

In the embodiment shown, single digit stations may be selected by depression of all buttons with the exception of the digit "TWO." Detection of a digit "TWO"

signals the system that a two digit station is involved and operates the transfer circuit in preparation for reception of the second digit. Thus, only 9 stations may be selected from a single button depression on a touch-tone telephone instrument. Referring again to FIG. 2, block 22 shows the relay contacts associated with the transfer relay K. K/B selects either single digit or two digit relay banks. Contacts K/A permit the existence of a station 22 in the system.

The transfer circuit for two digit operation is shown in FIG. 2 at 23. Q9 is switched "ON" whenever the external line loop is closed. This is accomplished by connecting the base of Q9 to the TIP side of the line via R10. The TIP side of the line is normally maintained positive through the winding of the line relay coil at 21 to the ground side of the system. The TIP side of the line goes negative whenever the external line loop is completed by the insertion of a telephone instrument into the loop. This normally occurs whenever the handset is lifted from a telephone instrument connected into the line. When Q9 is switched "ON," voltage is applied via D21 to the coil of the transfer relay K and to the anode of the silicon controlled rectifier Q8. Q8 is normally non-conducting. R12 connects the gate of Q8 to ground, namely, the positive side of the DC supply. The combination of D21, relay K, and R15 forms a voltage divider by means of which the anode of Q8 is maintained at a potential lower than the gate. This normally maintains Q8 in a non-conducting condition.

When the tones corresponding to a digit "TWO" are received and decoded in the diode matrix, Q7 is switched "ON" since the base resistors R9 and R8 are in the matrix path for relay K2. C8 discharges through transistor Q7. When the digit "TWO" signal is removed, Q7 turns off and C8 is routed towards the negative supply potential via resistor R11. This drops the gate voltage on Q8 below its anode voltage, causing it to conduct. When Q8 conducts, it pulls in the transfer relay K, causing contacts K/A to close, shunting out R9, R8, and Q7. This also places relay K2 in the matrix in the event that the second digit received is another "TWO." Thus, if two "TWO's" are depressed in sequence, the first digit "TWO" received will pull in the transfer relay while the second "TWO" will select station number 22.

Contacts K/B are also picked up with the K relay and serve to switch the audible signal supply from the single digit buss to the two digit buss feeding the signal relays. When the time-out circuit referred to above releases Q4, a positive pulse is applied to the base of Q9 via R16 and C6, momentarily turning off Q9. This cuts off the anode current of Q8, restoring Q8 to its normally off condition. Relay K is then released, preparing it for the next operation. Note that the transfer relay K can also be reset when the telephone is returned to an "ON" hook condition, turning off Q9.

The device also includes provision for supplying talking battery voltage for the telephone instruments connected to the system. Referring to FIG. 2, block 21 includes a line feed relay coil circuit. The line feed relay usually consists of a dual winding sandwich-wound relay. A battery and A ground are fed into each winding of the line coil. The direction of current flow is such that the windings are in phase and provide a magnetic field of sufficient strength to operate the reed relays if a short circuit or a standard telephone instrument is connected across the T and R windings of the intercom line. C22 serves to bring the relay coil into resonance at the lower frequencies. The line feed relay also provides DC power for the telephones and passes all AC signals which appear across the T and R terminals of the line.

A self-contained power supply is included in the device in order to regulate the supply voltage into the phase locked loops. This is required since the device is designed to operate from telephone systems in which the voltage may be in excess of the 18-28 VDC specified on common telephone equipment. Note that all the circuitry shown in FIG. 2 as well as the B transistors in the tone decoders operate from unregulated power available from the telephone system. Similarly, the time-out circuit described above operates from the unregulated supply but is switched during operation into the regulated supply via D1A. The telephone system supply, nominally minus 24 VDC, is connected to the collector of the regulating transistor Q1 shown in FIG. 1 at block 15. A limiting resistor R25 is inserted in series with the collector. R26 provides biasing currents to the Zener diode DZ1. This provides a reference voltage at the base of Q1. Q1 is shown connected as an emitter follower. The tone decoder loops provide the load circuit. Capacitor C16 acts as a filter and storage source, providing current during periods when there may be a momentary low voltage condition in the unregulated supply. Capacitor C15 filters out the low level, high frequency noise appearing at the base of Q1. System power to operate the device is supplied through the B battery input, while the A battery input provides power for telephone instruments connected into the system. In some alternative embodiments of the system, another device on the line may provide line battery power. In this case, the A battery would not be required and operation would be normal so long as the B battery is operating.

Returning to FIG. 1, the latching sequence can be summarized as follows:

1. Responsive to the instantaneous reception of a coded combination of tones, Q4 is turned on, generating a negative voltage at D as long as the associated QB signals are maintained.

2. Q3 is turned on, making the latch buss positive, locking the selected circuits 13, turning on the QA and QB transistors; Q4 is maintained "ON"; C1 starts charging. While the QA transistors are "ON" the tone detectors are latched so that they cannot respond to other tones.

3. After 500 msec, Q2 conducts; the positive voltage is removed from the latch buss; the QA and QB transistors are turned off, terminating the output signals; Q4 turns off, removing the negative signal from D; Q2 stops conducting and is returned to its original state.

The phase lock loop elements IC4, etc., are of a conventional type having a voltage controlled oscillator and means to generate an output signal proportional to the phase difference between the tone presented thereto and the voltage controlled oscillator. In the embodiments of the invention disclosed herein all of the phase lock loop elements employed are linear integrated circuits similar to "Signetics SE/NE 567," manufactured by Signetics Corp., Sunnyvale, California.

The above-mentioned latching action occurs because QA provides a low resistance feedback path between the output stage of the phase lock loop and the output stage of the quadrature phase detector portion of the phase lock loop. While this condition exists, the loop remains in a latched mode and will not track the incoming signal frequency.

Figure 3:
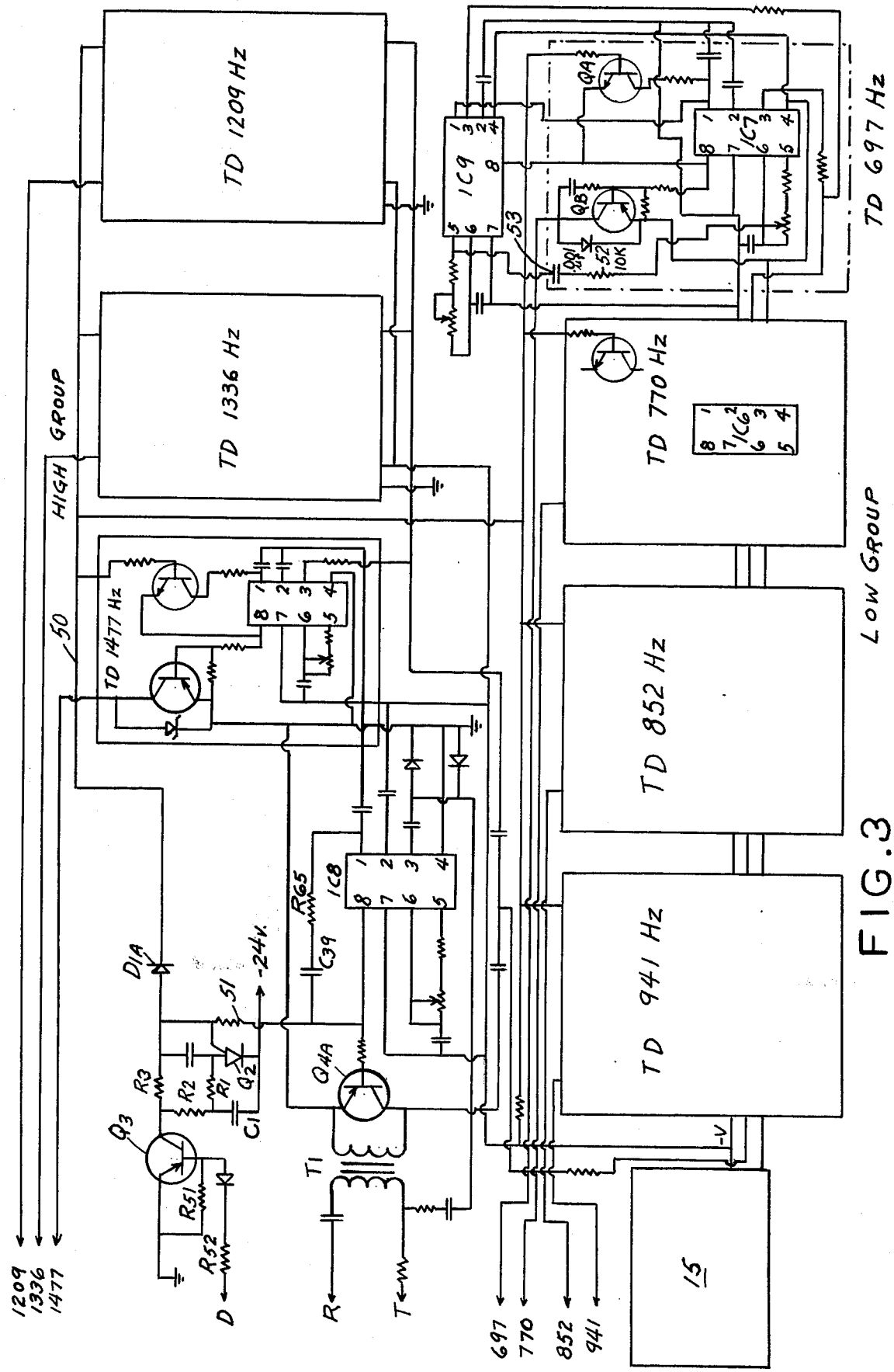
FIG. 3 is a schematic diagram of a tone decoder similar to that shown in FIG. 1, but modified to provide noise, or "talk-down," protection and to provide substantial reduction in the recognition time of the lowest frequency decoder of the system.

FIG. 3 is a modification of the circuit of FIG. 1 including the following changes:

1. The addition of a noise or "talk down" protection circuit such that if a signal of any type is present in the slot between the low group and high group touch tone signals, the input to the decoders is shunted out and the time-out circuit is disabled.

2. The addition of a second phase lock loop to the lowest frequency decoder in order to decrease the recognition time. The other decoders are fast enough at this time; however, the same addition could be made to all loops if necessary.

These modifications provide greater reliability for the detection of touch tone signals within a system where high level voice signals are present or in a system where speed of operation is essential.

Referring to FIG. 3, IC8 is a phase lock loop with its center frequency set at 1075 Hz. 1075 Hz is the mean frequency between the two touch tone frequency bands. The band width of this detector is made as wide as possible to cover the frequencies between 955 Hz and 1190 Hz. Most of the energy within a voice signal lies in this range of frequencies. Due to the band width of IC8 being made quite broad in comparison to the band widths of tone decoders IC1 through IC7, it will respond faster than they will to an input signal. If a signal with a frequency that lies within the capture range of IC8 is present at the input, IC8 will lock onto it and immediately shunt the input to the tone decoders via Q4A and turn on Q2 via resistor 51. There is a time constant associated with IC8, so that once it assumes the "shut down" condition it will remain in this condition for a period of time sufficient for a burst of noise or voice energy to have subsided from the input.

The frequency 697 Hz, also called L1, is the lowest of all the touch tone frequencies, consequently it has the longest detect time of all said touch tone frequencies. The addition of phase lock loop IC9, as shown in FIG. 3, decreases the detect time of IC by about 50%. Decoder IC9 is connected in a configuration such that its internal oscillator is being driven 180° out of phase referenced to the internal oscillator of IC7. This is accomplished by feeding the triangle wave output of IC7's internal oscillator into the quadrature output of IC9's internal oscillator via resistor 52 and capacitor 53. Using this circuit configuration provides two phase lock loops operating in parallel with their internal oscillators 180° out of phase. Therefore, with the application of an input signal with 697 Hz as one of the two tones present in the signal, it is assured that one of the two internal oscillators will be in phase with the incoming signal, hence speeding up the locking of the L1 tone decoder, which will give an immediate output verifying the presence of 697 Hz.

Aside from the above-described modifications, the circuit of FIG. 3 is generally similar to FIG. 1, employing the same latching transistor means and latching buss, shown at 50.

While certain specific embodiments of an improved telephone signalling device have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A telephone signalling device comprising tone detection means responsive to calling signal tones occurring on a telephone line to which the device is connected, said signal tones emanating from one or more touch-tone telephones connected to said telephone line, said tone detection means including a plurality of tone detectors each having a phase lock loop element having a voltage controlled oscillator and means to generate an output signal proportional to the phase difference between the tone presented thereto and said voltage controlled oscillator, and latching transistor means connected to each phase lock loop element so as to latch the loop element in its operating state and hold the phase lock loop elements unresponsive to other tones while the latching transistor means is activated, means to activate said latching transistor means for a predetermined time period responsive to the reception of a set of signal tones by said tone detectors, and a matrix of switching elements selectively activated by said tone detection means, said switching elements each being connected to a telephone instrument and actuating an indicator at said telephone instrument.

2. The telephone signalling device of claim 1, and wherein said means to activate the latching transistor means comprises a common latching buss connected to the inputs of said latching transistor means, means responsive to the output signals of responding tone detectors to generate a control signal, means responsive to said control signal to place latching voltage on said latching buss, and means to terminate said latching voltage at the end of said predetermined time period.

3. The telephone signalling device of claim 2, and wherein the means to place latching voltage on the latching buss comprises an energizing circuit branch including a transistor, a charging resistor and a capacitor connected in series, means connecting the output of the transistor to the latching buss, means to discharge the capacitor at the end of said predetermined time period subsequent to the turning on of said transistor, and means connecting said control signal to the base of said transistor.

4. The telephone signalling device of claim 3, and wherein the means to discharge the capacitor comprises a normally non-conducting timing transistor connected across the capacitor, said timing transistor having a gate electrode, and circuit means connecting said gate electrode to the output of said first-named transistor.

5. The telephone signalling device of claim 4, and wherein said calling signal tones comprise a high group of tones and a low group of tones, additional phase lock loop element having a lock frequency located in the slot range between said high and low group, circuit means connecting the input of the tone detection means to the input of said additional phase lock loop element, whereby to generate an inhibit signal at the output of said additional phase lock loop element responsive to the reception of such slot range frequency, and means to shunt the input of the tone detection means responsive to said inhibit signal.

6. The telephone signalling device off claim 4, and wherein said calling signal tones comprise a high group and a low group, an additional phase lock loop element having a lock frequency located in the slot range between said high and low group, circuit means connecting the input of the tone detection means to the input of said additional phase lock loop element, whereby to generate an inhibit signal at the output of said additional phase lock loop element responsive to the reception of such slot range frequency, and means to turn on said timing transistor responsive to said inhibit signal.

7. The telephone signalling device of claim 4, and a diode connected between the output of said first-named transistor and said latching buss.

8. The telephone signalling device of claim 1, and wherein said calling signal tones comprise a high group of tones and a low group of tones, and means to shunt the input to the tone detection means responsive to the presence in said input of a signal located in the frequency range between said high and low group.

9. The telephone signalling device of claim 1, and wherein said calling signal tones comprise a high group of tones and a low group of tones, and mens to deactivate said latching transistor means responsive to the presence in the input to the tone detection means of a signal located in the frequency range between said high and low group.

10. The telephone signalling device of claim 1, and an additional phase lock loop element having the same tone lock frequency as one of the first-named phase lock loop elements, and circuit means connecting said additional phase lock loop element and said one of the first-named loop elements in parallel with their internal oscillators 180° out of phase, whereby to speed up the locking of said tone frequency.

11. The telephone signalling device of claim 1, and wherein the phase lock loop elements are of a type having a main output stage and a quadrature phase detector portion, and wherein said latching transistor means is connected in a manner to define a low resistance feedback path between the main output stage and the output stage of the quadrature phase detector portion of the phase lock loop when the transistor means is activated.

* * * * *